Jan. 9, 1962  G. F. HAUSMANN  3,016,063
FLUID VALVE
Filed July 5, 1960
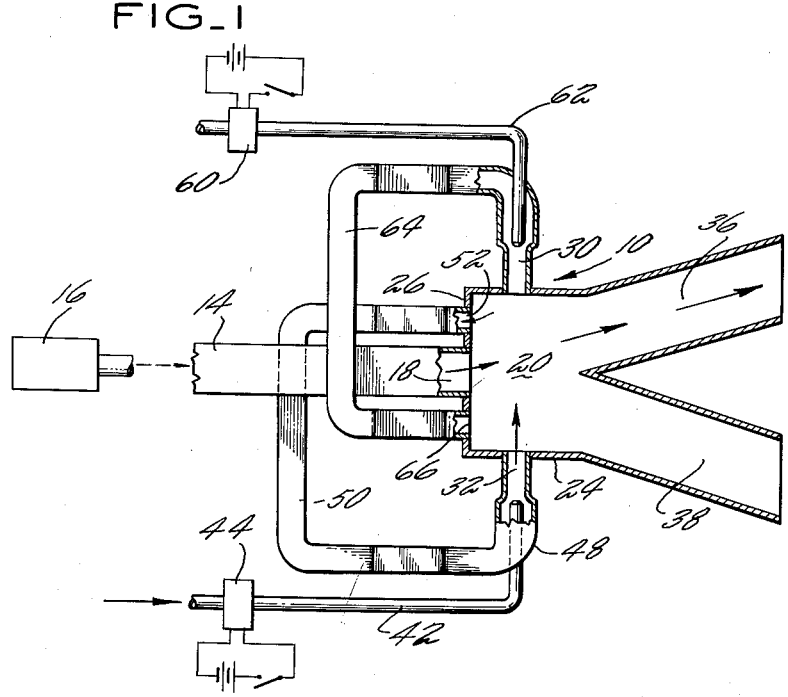
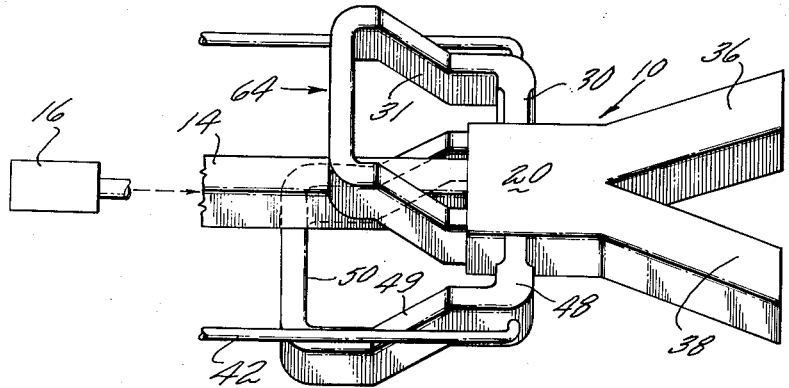
INVENTOR
GEORGE F. HAUSMANN
BY *Leonard F. Wetherell*
ATTORNEY

United States Patent Office 3,016,063
Patented Jan. 9, 1962

3,016,063
FLUID VALVE
George F. Hausmann, Glastonbury, Conn., assignor to United Aircraft Corporation, East Hartford, Conn., a corporation of Delaware
Filed July 5, 1960, Ser. No. 40,887
6 Claims. (Cl. 137—597)

This invention relates to fluid valves and more particularly to deflective-type fluid valves whereby a flow of low-energy fluid is used to divert a high-energy stream from one direction to another with no moving parts. Such valves have particular application to pure pneumatic computer elements and control devices which must be capable of operation in extreme environments of temperature, vibration, and nuclear radiation.

It is an object of this invention to provide a fluid valve of the fluid deflection type which includes control jets which operate with minimum power.

It is a primary object of this invention to provide a fluid deflection type which includes control jets which operate with minimum power.

It is a primary object of this invention to provide a fluid deflection type valve in which the control jets consists of ejectors which pump fluid from an area opposite the control jet to reduce the pressure on the opposite side of the main stream and thereby improve the effectiveness of the control jet in deflecting the main stream.

These and other objectives of this invention will become readily apparent from the following detailed description of the drawing in which, FIG. 1 is a schematic illustration of a valve of this invention including the ejectors.

FIG. 2 is a perspective view of the FIG. 1 construction.

Referring to FIGS. 1 and 2, a deflection-type valve is generally indicated at 10 as having a main elongated rectangular passage 14 which receives a fluid from the suitable source 16.

The main passage 14 terminates in a downstream exit 18 which emits a main stream flow into a chamber 20. The chamber 20 is substantially larger in cross section than the main passage 14 and is defined by an outer wall 24 and an upstream wall 26 running transversely of the axis of the main passage 14. A plurality of auxiliary jets 30 and 32 are directed transversely of the axis of the main passage 14 for selectively emitting air against the main stream in the chamber 20 to deflect the stream into either of the bifurcations 36 or 38 leading from the chamber 20. It is to be understood that only two bifurcated passages 36 and 38 are shown but any desired number can be utilized depending upon the particular application of the valve. The jet 32 is fed by an auxiliary line 42 which conducts fluid under pressure from a suitable source through, for example, a solenoid-operated valve 44.

When the main stream is to be deflected into the passage 36 as shown in FIG. 1, the solenoid valve 44 is open, thereby emitting a flow from the pipe 42 out of the control jet 32. The momentum of the control jet flow deflects the main stream. When so operating, the aspirator or ejector passage 48 pumps fluid from its connecting passage 50 which leads to an opening 52 at an opposite position in the chamber 20 with respect to the longitudinal axis of the main passage 14. The deflection action may be a steady condition or a pulsed action depending upon the use of the valve. The pump action of the ejector 48 reduces the pressure in the chamber 20 in the region immediately adjacent the opening 52 so as to further aid in deflecting the main stream so that the entire flow is into the passage 36.

In like manner, the solenoid valve 60 may be open so that the auxiliary jet 30 can operate to deflect the main stream into the passage 38. With the auxiliary jet 30 operating by reason of receiving auxiliary fluid from the pipe 62, the ejector action will pump fluid from the pipe 64 into the opening 66 adjacent the area in the chamber 20 which is opposite the jet 30 with respect to the axis of the main passage 14. The solenoid valves are shown by example only but may take any suitable form depending upon the speed, frequency or program of operation of the system.

This ejector or boot strap arrangement greatly decreases the auxiliary power necessary for operation of the valve and further insures a positive deflection of the main stream so that the entire stream will flow in only one of the bifurcated passages 36 and 38.

FIG. 2 illustrates the joggles obviously required in the ducting arrangement on the upstream end of the valve. Hence the duct 50 leading from ejector 48 must turn downwardly at 49 so that it passes under the main flow duct 14. Likewise the duct 64 leading from jet 30 is turned upwardly at 31 so that it passes over main duct 14.

It should be noted that the main passage 14 and the auxiliary jets have their ducts substantially rectangular and of the same height or depth as that of the chamber 20.

Although only one embodiment of this invention has been illustrated and described, it will be apparent that various changes may be made in the construction and arrangement of the various parts without departing from the scope of this novel concept.

I claim:

1. A fluid valve having a passage and a main fluid stream flowing therethrough, a flow exit for said passage, a plurality of ducts having a common inlet adjacent said exit, a plurality of control jets spaced about said exit directing fluid against the main fluid stream to deflect the latter, means for selectively operating at least one of said jets to direct the main fluid stream substantially into only one of said ducts, and means for increasing the deflecting capacity of said one said jet comprising an ejector operated by said jet and connected to an area of said exit opposite to said jet with respect to the main stream issuing from said exit.

2. A fluid valve having a passage and a main fluid stream flowing therethrough, a flow exit for said passage, a plurality of ducts having a common inlet adjacent said exit, a source of fluid, a plurality of control jets spaced about said exit directing fluid from said source transversely of and against the main fluid stream to deflect the latter, means for selectively operating at least one of said jets to direct the main fluid stream substantially into only one of said ducts, and means for increasing the deflecting capacity of said one said jet comprising an ejector operated by said jet and connected to an area of said exit opposite to said jet with respect to the axis of the main stream issuing from said exit, including a duct surrounding said one jet and having a fluid connection to said area.

3. A fluid valve having a passage and a main fluid stream flowing therethrough, a flow exit for said passage, said passage and exit having an axis, a plurality of ducts disposed at an angle with respect to said axis and having a common inlet adjacent said exit, a plurality of control jets spaced about said exit directing fluid against the main fluid stream to deflect the latter, means for selectively operating at least one of said jets to direct the main fluid stream substantially into only one of said ducts, and means for increasing the deflecting capacity of said one said jet comprising an ejector operated by said jet and connected to an area of said exit opposite to said jet with respect to the main stream issuing from said exit.

4. In a fluid valve having a main inlet passage, a source of fluid connected to said passage including means for producing a main flow of fluid in said passage, an outlet for said passage, a chamber receiving flow from said outlet and having a larger cross section than said outlet, said chamber including a wall running transversely of said main passage, a plurality of separate ducts leading downstream from said chamber, means for deflecting substantially the entire flow from said outlet into one of said ducts including an auxiliary jet connected to said chamber and directed substantially transversely of the axis of said main passage for directing auxiliary fluid against said main flow to deflect the latter toward a duct leading from said chamber at a point substantially on the opposite side of the connection of said auxiliary jet, means for selectively conducting fluid to said auxiliary jet, and ejector means connected to said jet including a connection to a point in said chamber adjacent said wall.

5. In a fluid valve having a main inlet passage, a source of fluid connected to said passage including means for producing a main flow of fluid in said passage, an outlet for said passage, a chamber receiving flow from said outlet and having a larger cross section than said outlet, said chamber including a wall running transversely of said main passage, a plurality of separate ducts leading downstream from said chamber, means for deflecting substantially the entire flow from said outlet into one of said ducts including an auxiliary jet connected to said chamber and directed substantially transversely of the axis of said main passage for directing auxiliary fluid against said main flow to deflect the latter toward a duct leading from said chamber at a point substantially on the opposite side of the connection of said auxiliary jet, means for selectively conducting fluid to said auxiliary jet, and pumping means operative simultaneously upon a flow of fluid through said jet, said pump means including a connection to a point in said chamber adjacent said wall and substantially diametrically opposite said jet whereby the pressure in said chamber adjacent said point is substantially reduced.

6. In a fluid valve having a main inlet passage, a source of fluid connected to said passage including means for producing a main flow of fluid in said passage, an outlet for said passage, a chamber receiving flow from said outlet and having a larger cross section than said outlet, said chamber including a wall running transversely of said main passage, and connecting together the walls of said passage and chamber, a plurality of separate ducts leading downstream from said chamber, said ducts having an axis at an angle with respect to said passage, an auxiliary source of fluid, means for deflecting substantially the entire flow from said outlet into one of said ducts including an auxiliary jet connected to said chamber and directed substantially transversely of the axis of said main passage for directing fluid from said auxiliary source against said main flow to deflect the latter toward said one duct, said one duct leading from said chamber at a point substantially on the opposite side of the connection of said auxiliary jet pipe relative to the main stream, means for selectively conducting fluid to said auxiliary jet from said source and pumping means operative simultaneously upon a flow of fluid through said jet, said pump means including a connection to a point in said chamber adjacent said wall and substantially opposite said jet whereby the pressure in said chamber adjacent said point is substantially reduced.

No references cited.